Sept. 8, 1959
J. M. PALMER
2,903,293
CANTILEVER TILTING ARC SUPPORT
Filed Oct. 12, 1953
3 Sheets-Sheet 1
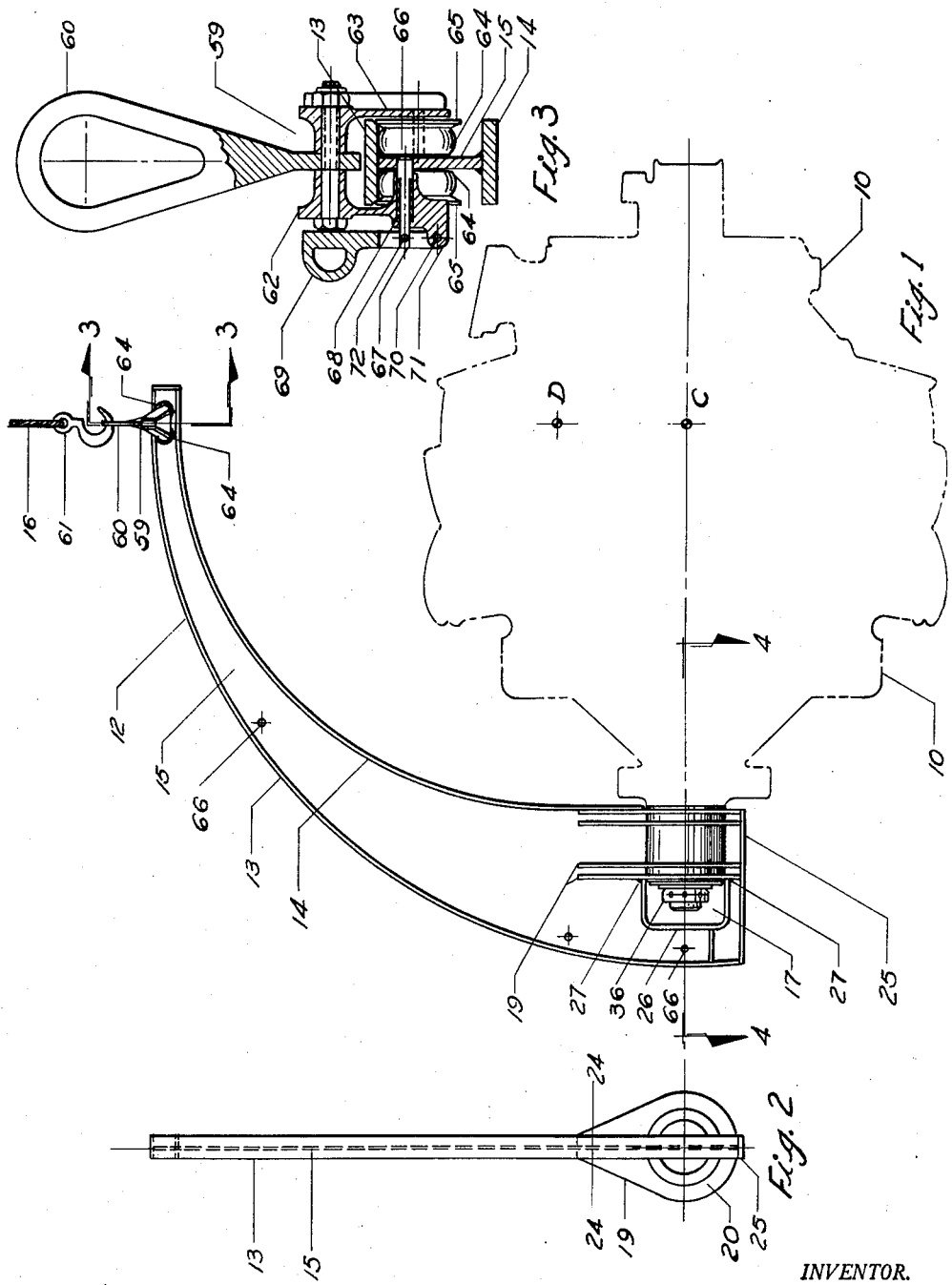
INVENTOR.
BY J.M. PALMER
S. Tierney, Jr.

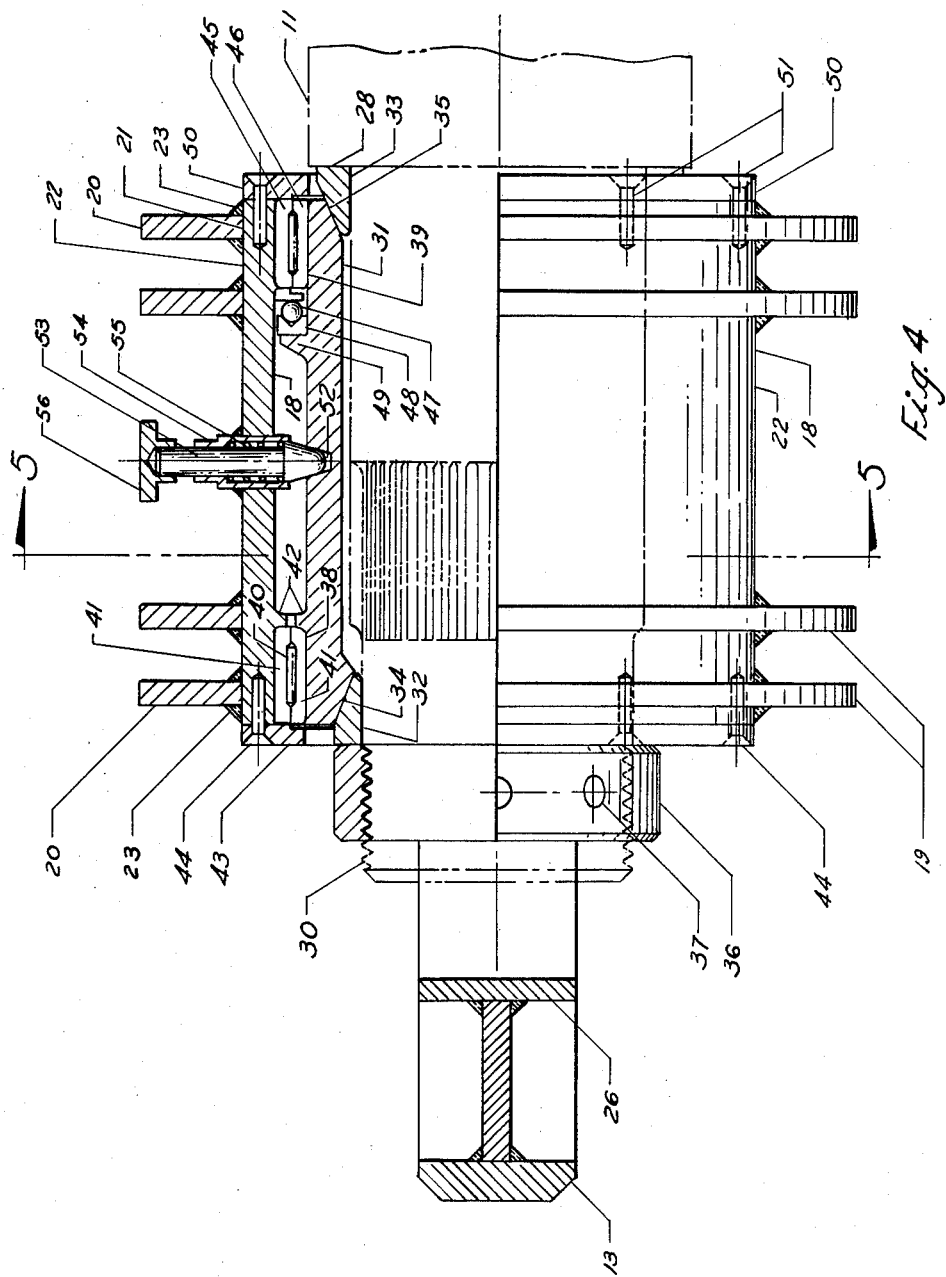

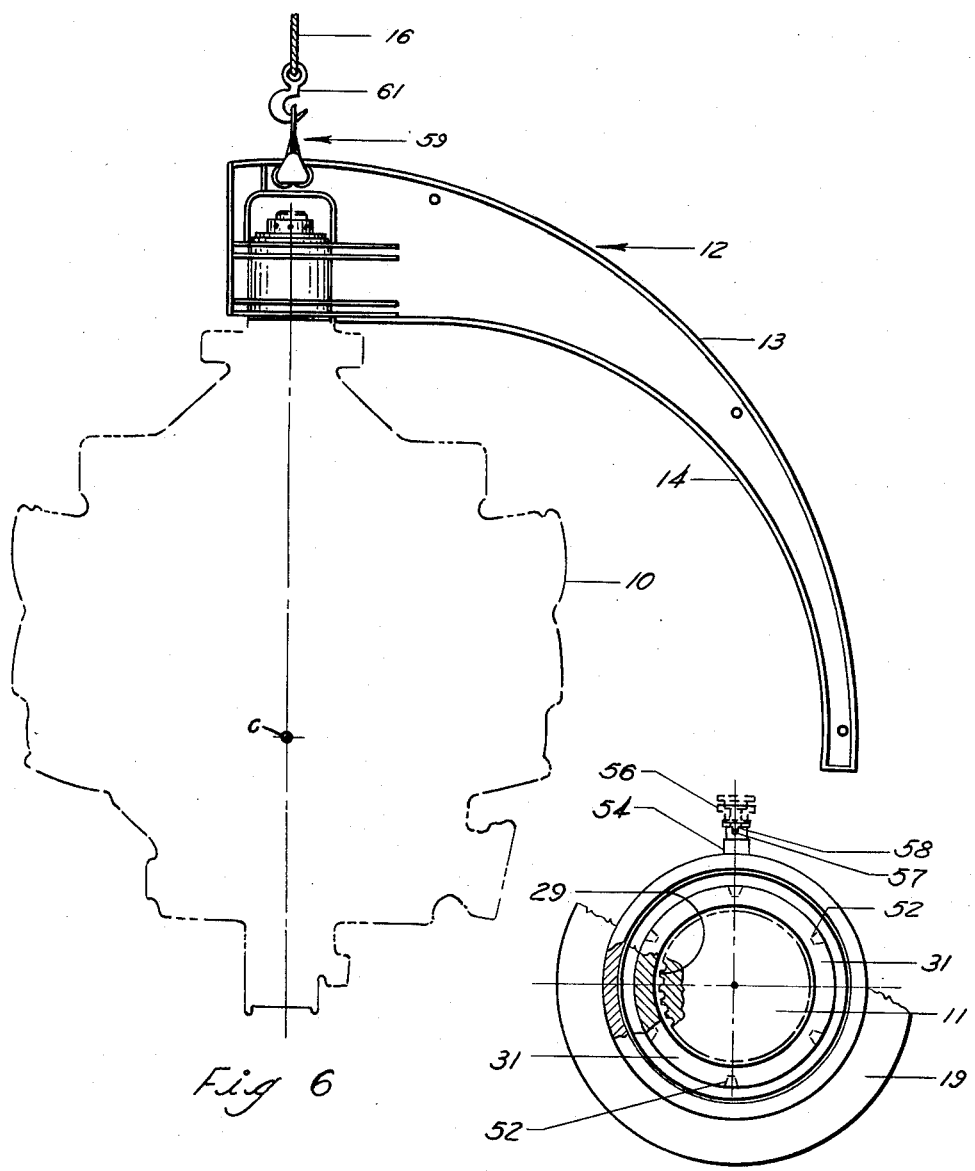

United States Patent Office 2,903,293
Patented Sept. 8, 1959

2,903,293
CANTILEVER TILTING ARC SUPPORT

Jack M. Palmer, Chula Vista, Calif., assignor to Rohr Aircraft Corporation, Chula Vista, Calif., a corporation of California Application October 12, 1953, Serial No. 385,565

5 Claims. (Cl. 294—78)

This invention relates to a support for heavy objects and more especially machines which require during their manufacture or repair to be set in many different positions.

An object of the invention is to provide a support of this character having advantages over previously designed supports in that fewer parts are required in its construction and less time in manufacture and assembly.

Another object is to provide a support whose principal components are a suspended arcuate track, a bearing housing at one end of the track and antifriction bearings within the housing adapted to support the object for easy rotation. The support is especially adapted for supporting machines, such as engines, having a rotary shaft about which several pistons or other component moving parts are symmetrically arranged. The support provides for holding such machines so that they are capable of being turned throughout 360° and also tilted bodily throughout an arc of 90° to the end that the machine may be adjusted into substantially any angular position wherein it is readily accessible for working thereon.

A further object is the provision of a machine support in the form of a cantilever tilting arc capable of supporting the entire weight of the machine from one end of its rotary shaft so that there are no obstructions around the rest of the machine to prevent free access to any part thereof by the workman.

A still further object is to support the machine by its shaft in such a manner that no member has frictional or rubbing contact with the shaft as the machine is rotated to different angular positions whereby wear of the shaft is entirely eliminated.

When used to support an airplane engine which has splines formed on its shaft to register with corresponding splines on a propeller, it is a further object of the invention to effect the support without any injury or damage to the splines.

Further objects will become apparent as the description of the support proceeds. For a better understanding of the invention reference is made to the accompanying drawings, in which:

Fig. 1 is a front view of an engine support embodying the invention and an outline of a radial airplane engine supported therein;

Fig. 2 is an end view of the support of Fig. 1 with certain parts omitted.

Fig. 3 is a sectional view on an enlarged scale of a portion of the support taken on line 3—3 of Fig. 1;

Fig. 4 is a sectional view on an enlarged scale taken on line 4—4 of Fig. 1;

Fig. 5 is a sectional view taken through line 5—5 of Fig. 4 and;

Fig. 6 is a view similar to Fig. 1 showing the engine being supported in a vertical position.

The support is shown supporting a multi-cylinder radial engine 10 which has a central shaft 11 about which the engine is symmetrical. The support comprises an arcuate I beam 12 having an outer flange 13 connected to inner flange 14 by a vertical web 15 whose width increases progressively from top to bottom as shown in Fig. 1. Flange 13 has the shape of a circular arc of somewhat more than 90 degrees extent and its center C is directly under a vertical lifting cable 16. Flange 14 is curved to a circular arc about a center indicated at D. Near their lower ends flange 14 and web 15 are cut away to provide an opening 17 to receive a generally cylindrical horizontal housing 18 which is secured in place by four similar spaced apart plates 19. Each plate has a lower annular portion 20 which surrounds housing 18 and whose inner face 21 (Fig. 4) fits against the peripheral face 22 of the housing, the plate being welded to the housing as indicated at 23. Each plate has a pair of tapering portions (Fig. 2) which have straight faces 24 seated against the opposite sides of vertical web 15 and welded thereto. The bottom of each plate is welded to a metal strip 25 which extends to flange 13 and is welded thereto. To further strengthen the assembly, a U-shaped plate 26 extends through opening 17 for equal distances on the opposite sides of web 15 and is welded to both sides thereof. The ends of plate 26 are welded to the face of end plate 19 as indicated at 27.

The end of engine shaft 11 is of reduced diameter to provide a shoulder 28 and a set of splines 29 which extend through 360°, these splines being complemental to a similar set on the airplane propeller (not shown) which the engine is designed to drive. The end portion of shaft 11 is screw threaded at 30 to receive a nut (not shown) which secures the propeller on the shaft. A generally cylindrical sleeve 31 is secured to the end of the shaft by means of a pair of collars 32, 33 which have oppositely tapered faces 34, 35 seated against correspondingly tapered faces on sleeve 31. A nut 36 screwed onto thread 30 biases collar 33 against shoulder 28 and causes the collars to grip the shaft and lock sleeve 31 thereto. It will be noted that the inside diameter of sleeve 31 in the region surrounding splines 29 is greater than the diameter across the splines so that there is no danger of any injury to the splines during assembly of the parts or while supporting the engine. Nut 36 is preferably provided with a set of holes 37 to receive the pin of a spanner wrench (not shown) used to tighten the nut, the space 17 around the nut permitting the insertion and turning of the wrench.

Referring to Figs. 1 and 4, when the engine is in a horizontal position its entire weight is supported by two sets of needle bearings 38, 39, each bearing having a plurality of small rollers or needles 40 spaced only a small distance apart, the needles of bearing 38 being contained within inner and outer races 41. These races are prevented from movement in an axial direction by a pair of circular flanges 42 projecting from sleeve 31 and housing 18 and a circular ring 43 secured to the end of housing 18 by means of a plurality of screws 44. The outer race 45 of needle bearing 39 is longer than the inner race 46 and its end toward the left serves as the race for a set of closely adjacent balls 47 seated in a race 48. An annular flange 49 projecting out from sleeve 31 and an annular plate 50 secured to the end of housing 18 by a plurality of screws 51 serve to retain the combined ball and needle bearings in place. As shown, there is a small clearance between the end of race 46 and plate 50 for a purpose to be later described.

To lock the engine 10 and sleeve 31 in definite angular position, sleeve 31 is provided with six equally spaced apart holes 52 to receive the tapered end of a plunger 53 slidably supported within a tube 54. Tube 54 is welded to sleeve 31 and encloses a coil spring 55 which biases the plunger inwardly. A knob 56 is secured to the end of plunger 53 which may be grasped by the operator to retract the end of the plunger from any hole 52 to permit sleeve 31 and the engine to be rotated. Plunger 53 carries a transversely extending pin 57 (see Fig. 5) movable within a slot 58 in tube 54 and by pulling knob 56 and rotating it through 90°, the pin 57 becomes seated on the end of tube 54 as shown in dotted lines and holds plunger 53 in retracted position.

To permit the engine shaft to be set in a vertical position or tilted at any desired angle, a trolley 59 is provided (see Fig. 1 and 3), the trolley having an eye 60 adapted to receive a hook 61 secured to the end of cable 16. The trolley has parallel sides 62, 63 spaced from center web 15 and each having a pair of spaced apart pins on which rollers 64 are rotatably mounted. Flange 13 of beam 12 rests on these rollers and may be rolled along them, and to prevent the rollers from rubbing against web 15, each roller is provided with a projecting rim 65 which contacts the outer edge of flange 13. For the purpose of locking I beam 12 to trolley 59 in any one of several positions, a plurality of holes 66 are drilled in web 15, the trolley having a slidable pin 67 arranged to be pressed into any hole by a coil spring 68. The pin may be withdrawn by means of a lever 69 pivoted at 70 to a lug 71 projecting from side 62, the lever being connected to the end of pin 67 by a pivot pin 72.

To support engine 10 with its shaft 11 horizontal, housing 18 along with collars 32, 33 are slipped over the end of the shaft and nut 36 tightened. This locks sleeve 31 and the collars fast to the shaft. The engine may then be hoisted to any convenient height by operating a winch (not shown) around which the upper end of cable 16 is wound. The weight of the engine and I beam 12 and its associated bearing parts is such that the center of gravity of the assembly is directly under cable 16 as indicated at C so that the engine shaft remains horizontal, notwithstanding the fact that the engine is supported at only one end. The operator may easily rotate the engine manually to make any part thereof more accessible for repair or replacement, the collars 32, 33 and sleeve 31 being locked to engine shaft 11 and turning with it. The entire weight of the engine is taken by needle bearings 40. The operator may lock the engine in any one of several positions by inserting the end of plunger 53 in one of the holes 52 in sleeve 31.

To move the engine so that its shaft is vertical, lever 69 is operated to withdraw pin 67 from its hole 66, then the operator pushes up on plate 25 or housing 18 causing the flange 13 to roll along rollers 64 until the upper end of the engine shaft is directly under trolley 59 as shown in Fig. 6. Even with a heavy engine, this does not require the application of much force for the reason that the center of gravity of the mass being moved is at the center of curvature of flange 13. When the hole 66 opposite the end of shaft 11 is opposite locking pin 67, the end of the pin will enter this hole and lock the I beam 12 in position with the engine shaft vertical. The entire weight of the engine is now applied by thread 30 to nut 36 from which the downward force is transmitted to housing 18 via collar 32, sleeve 31, flange 49, ball race 48, balls 47, bearing race 45 and circular plate 50, the needles 40 of the antifriction bearings not transmitting any of the pressure. With the engine shaft vertical, the engine may be rotated to any desired angular position and, since it is entirely supported at one end, the opposite end and the entire outside of the engine is accessible to the operator. To set the engine and shaft to a position intermediate horizontal and vertical, the operator moves I beam 12 along rollers 64 to the desired position. The intermediate holes 66 permit the engine to be locked at definite angular positions.

While the invention has been illustrated in relation to a radial type of airplane engine, it will be understood that it is useful for supporting heavy objects of any type and especially heavy machines which are substantially symmetrical about an axis or central shaft.

This invention may be embodied in other forms or carried out in other ways without departing from the spirit or essential characteristics thereof. The present embodiment of the invention is therefore to be considered as in all respects illustrative and not restrictive, the scope of the invention being indicated by the appended claims, and all changes which come within the meaning and range of equivalency of the claims are intended to be embraced therein.

Having thus described my invention, what I claim is new and useful and desire to secure by Letters Patent is:

1. Means engageable with the projecting splined end portion of the cylindrical shaft of a machine for supporting the entire weight of the machine therefrom comprising, in combination: an arcuate I beam whose outer flange is shaped as a circular arc and extends through an angle somewhat more than 90°; a supporting trolley having spaced apart rollers in engagement with the inner surface of said outer flange and along which the outer flange may roll; a cylindrical housing secured to one end of said beam and extended inwardly of said outer flange along a radius of said arc; a sleeve for receiving said splined end portion of the shaft therewithin, said sleeve having an inner wall spaced from and clear of the splines on the shaft when said end portion of the shaft is disposed concentrically within the sleeve; means including elements mutually engageable with the ends of said sleeve and with the shaft at points spaced axially away from the ends of said splines for releasably locking said sleeve to the shaft concentrically therewith; and means including a plurality of anti-friction bearings for rotatively supporting said sleeve within said housing concentrically therewithin.

2. Means engageable with the projecting end portion of the cylindrical shaft of a machine for supporting the entire weight of the machine therefrom comprising, in combination: an arcuate I beam whose outer flange is shaped as a circular arc and whose interconnecting web increases progressively in width from one end of the beam to the other, said outer flange extending through an angle of somewhat more than 90°; a supporting trolley having spaced apart rollers disposed on each side of said web in engagement with the inner surface of said outer flange and along which the outer flange may roll; a cylindrical housing immovably secured to said other end of the beam and extended inwardly of said outer flange along a radius of said arc; a sleeve disposed within said housing for receiving said projecting end portion of the machine shaft, said sleeve having a plurality of spaced openings in a plane normal to the axis of the sleeve; means engageable with said sleeve and with said end portion of the shaft for releasably locking the sleeve to the shaft; means including a plurality of anti-friction bearings for supporting said sleeve for rotation within said housing concentrically therewithin; and a locking pin slidably supported by said housing and insertable selectively into any of said openings to lock said sleeve, shaft, and machine in desired rotated position.

3. Means engageable with the projecting reduced threaded end portion of the cylindrical shaft of a machine for supporting the entire weight of the machine therefrom in any angular position of the shaft between horizontal and vertical positions thereof comprising, in combination: an arcuate I beam whose outer flange is shaped as a circular arc extending through an angle of somewhat more than 90° and whose interconnecting web increases progressively in width from one end of the beam to the other, said web and the inner flange of said I beam being cut away to provide an opening in the web at said other end of the beam; a supporting trolley having spaced apart rollers disposed on each side of said web in engagement with the inner surface of said outer flange and along which the outer flange may roll; a cylindrical housing partially filling said web opening and immovably secured to said web therewithin, said housing extending inwardly of said outer flange along a radius of said arc; a sleeve disposed within said housing for receiving said projecting end portion of the machine shaft with the threads on the shaft extended through the sleeve and into the unfilled portion of said web opening; a nut engageable with said threads within said unfilled opening portion and having spaced apart peripheral portions accessible through said unfilled opening portion to receive the end of a wrench for adjusting the nut; means mutually engaging the ends of said sleeve and the machine shaft and respectively disposed adjacent said nut and adjacent the shoulder defined by the reduced end portion of the shaft for releasably locking the sleeve to the shaft upon adjustment of the nut toward said shoulder; and means including first and second sets of anti-friction bearings for rotatively supporting said sleeve within said housing concentrically therewithin and with the center of gravity of said I beam, bearing means, and machine disposed substantially at the center of curvature of said arc, said first set of bearings providing the sole rotative support for the machine when its shaft is horizontal, said second set of bearings providing the sole rotative support for the machine when its shaft is vertical.

4. Means engageable with the projecting end of the shaft of an engine for supporting its entire weight therefrom comprising, in combination: an arcuate I beam whose outer flange is shaped as a circular arc extending through an angle of somewhat more than 90° and whose interconnecting web increases progressively in width from one end of the beam to the other, said web and the inner flange of said I beam being cut away at said other end of the beam to provide an opening in the web; a trolley for supporting said beam and having spaced rollers in engagement with the inner surface of said outer flange and along which the outer flange may roll; means including a sleeve for receiving and releasably locking said projecting end of the engine shaft within the sleeve; and bearing means secured to said web within said opening for rotatively supporting said sleeve therewithin with the axis of rotation of the sleeve aligned with a radius of said arc and with the center of gravity of said I beam, bearing means, and engine disposed substantially at the center of curvature of the arc, said bearing means comprising first and second sets of bearings for rotatively supporting the engine selectively in angular positions ranging from horizontal to vertical position of the engine shaft and separately rotatively supporting the engine in said horizontal and vertical positions of the shaft respectively.

5. Means engageable with the projecting end portion of the cylindrical shaft of a machine for supporting the entire weight of the machine therefrom comprising, in combination: an arcuate I beam whose outer flange is shaped as a circular arc extending through an angle somewhat more than 90°; a supporting trolley having spaced apart rollers in engagement with the inner surface of said outer flange and along which the outer flange may roll; a cylindrical housing secured to one end of said beam and extended inwardly of said outer flange along a radius of said arc; a sleeve disposed within said housing concentrically therewithin for receiving said projecting end portion of the machine shaft with the center of gravity of the I beam and machine disposed substantially at the center of curvature of said arc; means for releasably securing said sleeve to said end portion of the shaft; a first set of anti-friction bearings disposed between said sleeve and housing for supporting the machine shaft in a horizontal position and the entire weight of the machine when said outer flange is in contact with said rollers at said one end of the beam; and a second set of anti-friction bearings disposed between said sleeve and housing for supporting the machine shaft in a vertical position and the entire weight of the machine in response to movement of the I beam to bring said outer flange into contact with the rollers at the other end of the beam.

References Cited in the file of this patent

UNITED STATES PATENTS

| | | |
|---|---|---|
| 1,966,905 | Ruth | July 17, 1934 |
| 2,013,733 | Murphy | Sept. 10, 1935 |
| 2,165,921 | Duda | July 11, 1939 |
| 2,368,947 | Smith | Feb. 6, 1945 |
| 2,586,263 | Rose | Feb. 19, 1952 |
| 2,627,109 | Bock et al. | Feb. 3, 1953 |
| 2,703,252 | Blackwell | Mar. 1, 1955 |